July 17, 1934.  G. S. BINCKLEY  1,966,537
MEANS FOR TRANSMISSION OF MOTION
Original Filed Oct. 29, 1928
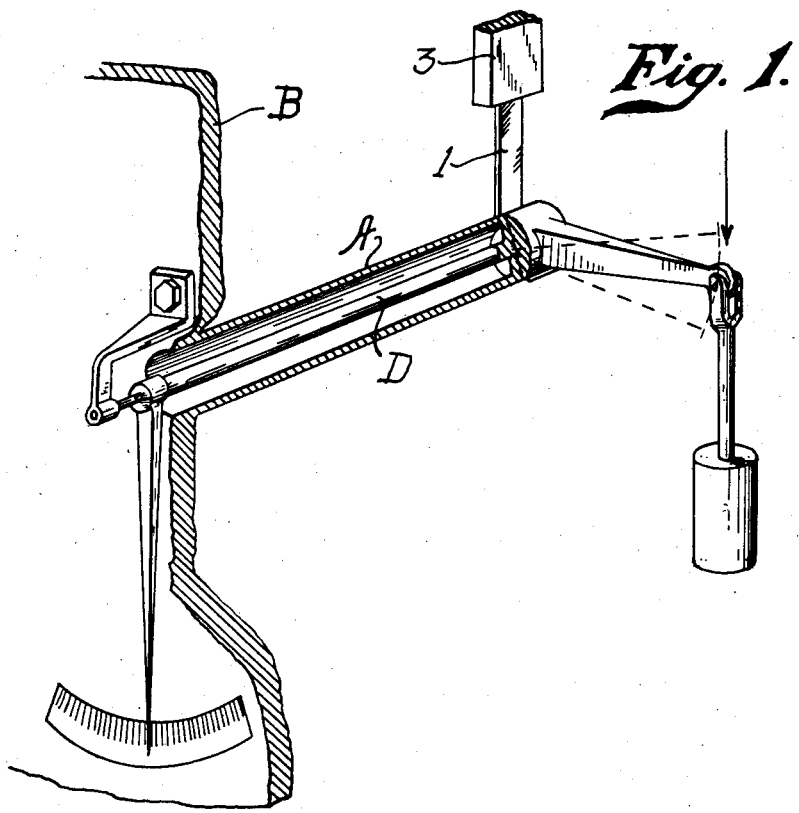
INVENTOR.
George S. Binckley;
BY
ATTORNEY Patented July 17, 1934

1,966,537

UNITED STATES PATENT OFFICE 1,966,537

MEANS FOR TRANSMISSION OF MOTION

George S. Binckley, Los Angeles, Calif.

Continuation of application Serial No. 315,881, October 29, 1928. This application October 12, 1931, Serial No. 568,276

2 Claims. (Cl. 74—5)

This invention relates to means for the transmission of a limited amount of motion from one side of a wall to another, from the interior of a closed chamber to its exterior or from its exterior to its interior.

The object of the invention is to provide means whereby a limited amount of motion, originating on one side of a wall, may, without the existence of any opening in the wall, be transmitted through said wall without recourse to any means involving any friction, wear, or leakage.

A further object of this invention is to provide as an incident to the accomplishment of the first object, elastic resistance to the action of part or all of the force producing the motion to be transmitted, so that the elastic deformation of the essential elements of the invention shall perform the dual function of transmitting motion and providing an elastic resistance to the force producing such motion.

A further object of this invention is to produce, for the purpose set forth, simple, cheap, and reliable means adaptable to a wide range of pressure conditions, materials of construction, and practical applications.

With the above and other objects in view, the invention consists in the novel and useful provision, formation, construction, and relative arrangement of parts, members, and features, all as shown in the accompanying drawing, described generally, and more particularly pointed out in the claims.

This application is a continuation of my co-pending application Serial No. 315,881, filed October 29, 1928, Patent No. 1,827,560, issued October 13, 1931, for Means for transmission of motion.

In the drawing:

The figure is a perspective view shown partly in section, of the preferred form of my invention, showing the rod connected to a pointer for indicating the magnitude of the force applied to produce torsional strain in the tube A.

The essential elements of this invention are:

A wall B to which is firmly fixed a tube A, open at the end fixed to wall B, and closed at the other end, and a rod D attached to tube A at its sealed end. Tube A thus becomes in effect an integral part of wall B and rod D attached firmly to tube A and passing through tube A without contact with its walls, is in effect integral with this tube and with the wall B.

In the preferred form of this invention, as shown in the figure, the force producing the motion which it is desired to transmit through the wall B is applied in such a manner as to produce a torsional deformation of tube A. To give maximum effect to this force, it is applied to the sealed end of tube A so that the torsional deformation produced will be a maximum at this point, and the rotation of the tube around its axis at its sealed end is transmitted directly through wall B by rotation of the rod D. The junction of tube A with the wall B is of such a nature as to preclude the possibility of any leakage or any movement as between the tube and the wall where they are joined. The other end of tube A is sealed with equal effect. The sealed end of the tube may be mounted in any suitable manner to permit slight rotation thereof about its axis under the influence of a torsional force applied thereto. As illustrated, the sealed end of the tube is secured to one end of a resilient metal ribbon 1 which extends partly around said sealed end of the tube, the ribbon being secured at its other end to any suitable mounting 3. Tube A may be circular, elliptical, corrugated, or any other desired figure of cross-section.

To the free end of rod D outside the open end of tube A may be attached to any desired mechanical means for amplifying the effect of its rotation, such as a lever, a gear segment, or a pulley. Such rotation of rod D may be employed directly or indirectly to operate valves or other mechanical devices, to open or close electric circuits, or to actuate the mechanism of indicating or recording instruments which may be employed in connection with the motion transmitted through wall B from some source of motion on its opposite side.

Tortion may be applied to the sealed end of tube A through mechanism actuated by a float in a tank, a piston, a diaphragm, a bellows, or in fact any desired means through which such torsional deformation of the tube A can be produced, and as such force is opposed either wholly or in part by the elastic resistance of the material of the tube A, it follows that the elastic deformation of the tube A will be proportional to the force applied to produce this deformation. The strict proportionality of the motion produced on one side of the wall, to the force operating to produce this motion on the other side of the wall, can thus be utilized in indicating or recording the magnitude of this force, or through appropriate mechanism, of controlling the magnitude of the force itself.

I claim:

1. In a device for transmitting motion, a wall, a tube having one end closed and its other end fixed to and in effect integral with said wall, means external to said tube and adjacent the closed end for applying force to produce elastic deformation of said tube, and a ribbon attached to said tube adjacent the closed end for supporting said end.

2. In a device for transmitting motion, an anchoring means, a tube having one end thereof fixed to said anchoring means, means external said tube for applying force to produce torsional deformation of said tube, and a ribbon attached to said tube adjacent the means for applying force thereto to permit torsional deformation of said tube and substantially no downward deflection thereof.

GEORGE S. BINCKLEY.